United States Patent [19]

Ford

[11] Patent Number: 4,513,824
[45] Date of Patent: Apr. 30, 1985

[54] FLEXIBLE HORSESHOE

[76] Inventor: Donald F. Ford, 2011 D Sierra Rd., Concord, Calif. 94518

[21] Appl. No.: 553,274

[22] Filed: Nov. 18, 1983

[51] Int. Cl.³ .............................. A01L 3/02; A01L 5/00
[52] U.S. Cl. ............................... 168/4; 168/DIG. 1; 168/24
[58] Field of Search ............................ 168/4, 6, 23, 24

[56] References Cited

U.S. PATENT DOCUMENTS

| 514,753 | 2/1894 | Jerome | 168/4 |
|---|---|---|---|
| 985,249 | 2/1911 | Butschko | 168/4 |
| 1,148,886 | 8/1915 | Bird | 168/24 |
| 2,024,265 | 12/1935 | Anderson et al. | 168/4 |
| 3,340,933 | 9/1967 | McGraw et al. | 168/24 |

FOREIGN PATENT DOCUMENTS

| 1191625 | 4/1965 | Fed. Rep. of Germany | 168/4 |
|---|---|---|---|
| 188389 | 11/1922 | United Kingdom | 168/24 |

Primary Examiner—Robert P. Swiatek
Attorney, Agent, or Firm—Townsend and Townsend

[57] ABSTRACT

A screw-on horseshoe formed from a plastic material is disclosed. A flex joint is provided that allows the horseshoe to expand and contract as pressure is applied to the horse's hoof, thereby reducing friction between the hoof and the shoe. The horseshoe also provides a lip portion projecting upwardly from a horseshoe base portion to protect the horse hoof wall from obstacles encountered during the movement of the horse. A novel screw having a double helix thread pattern including a high thread pattern and a low thread pattern is used to fasten the horseshoe to the horse's hoof without piercing the hoof wall. The screw includes a keyed recessed self-holding head that is complementary to, and therefore readily driven by, a power drill. A lightweight, yet wear-resistant, horseshoe that is readily attached to a horse's hoof with a minimum amount of labor and a minimum amount of damage to the hoof that can be constructed in many styles and sizes to match a large variety of horse uses is thus described.

4 Claims, 18 Drawing Figures

U.S. Patent    Apr. 30, 1985    Sheet 1 of 4    4,513,824
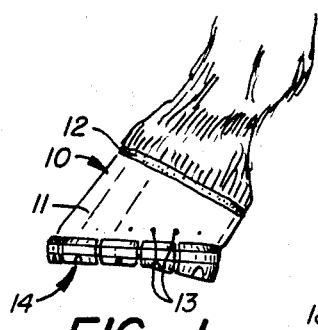
FIG._1.
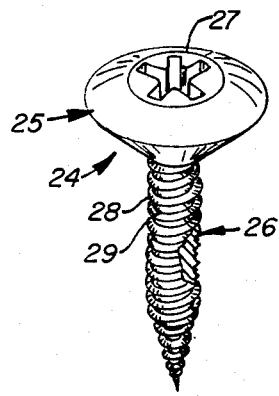
FIG._3.
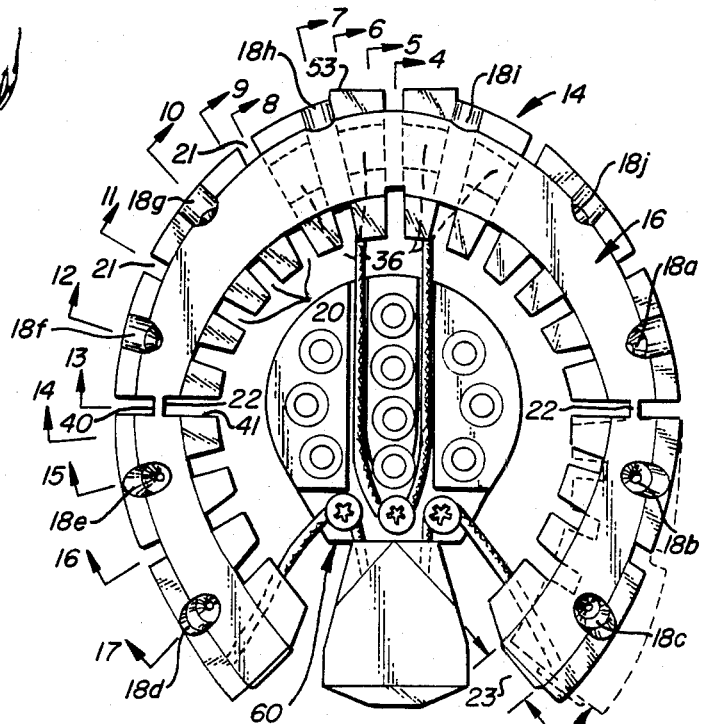
FIG._2.
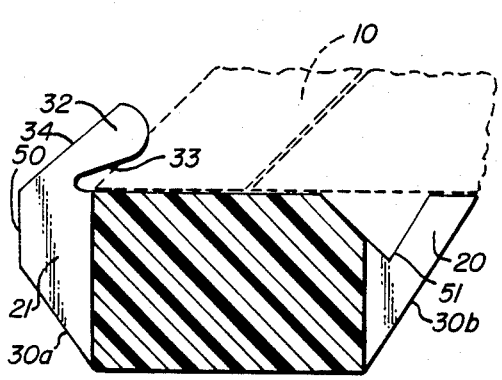
FIG._4.
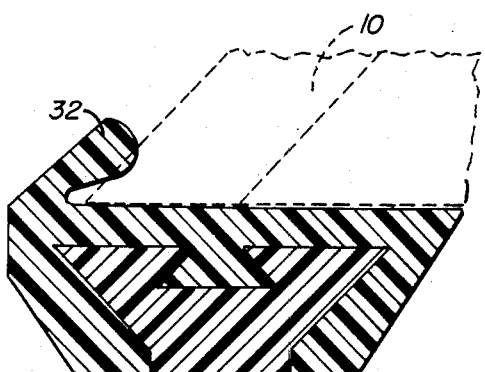
FIG._5.

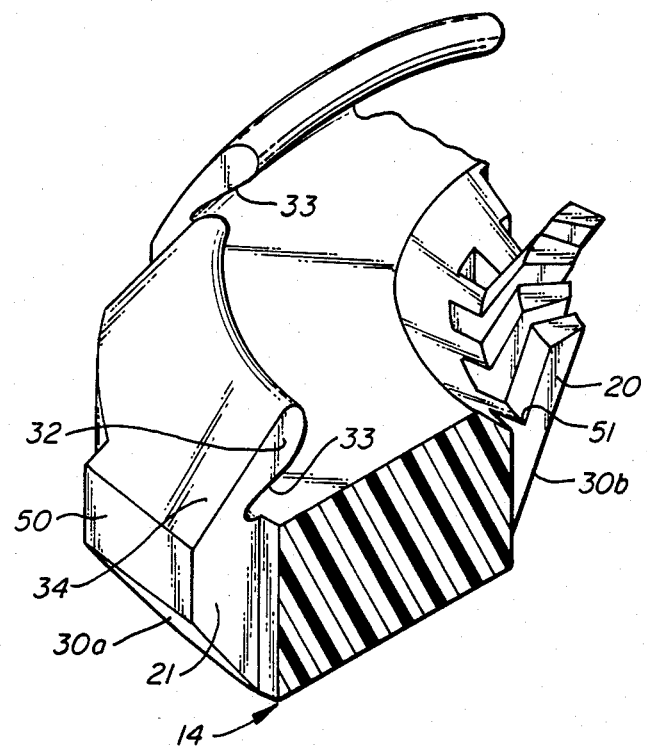
FIG._4A.

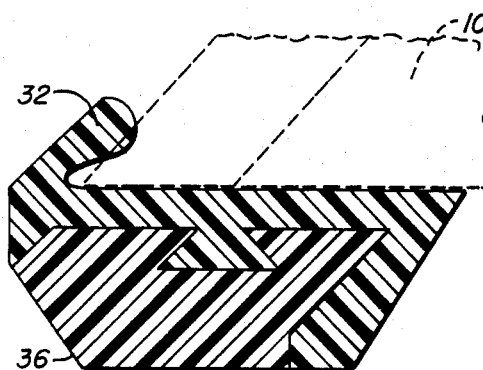
FIG._6.
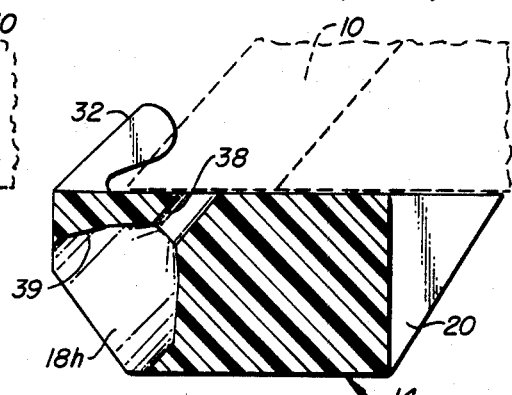
FIG._7.
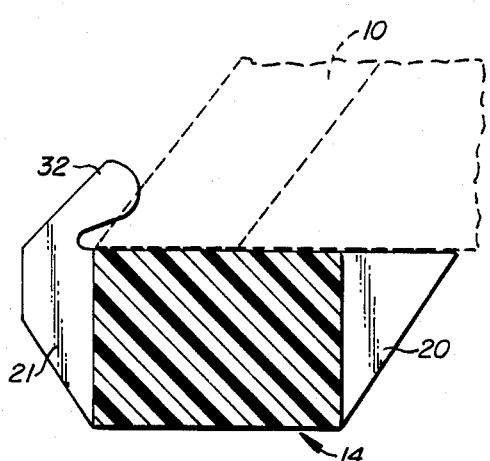
FIG._8.
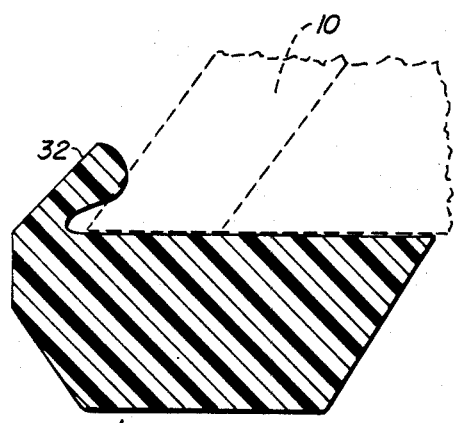
FIG._9.
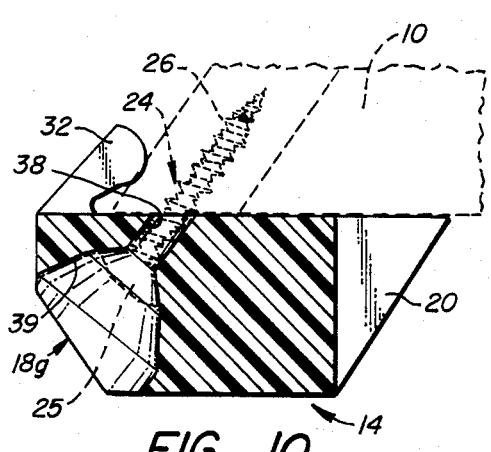
FIG._10.
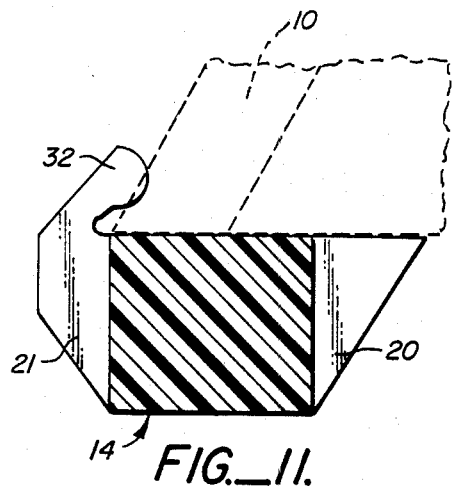
FIG._11.

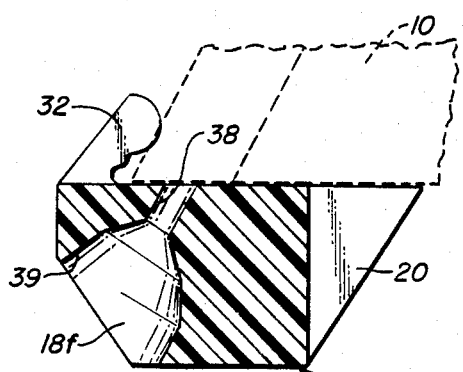
FIG._12.
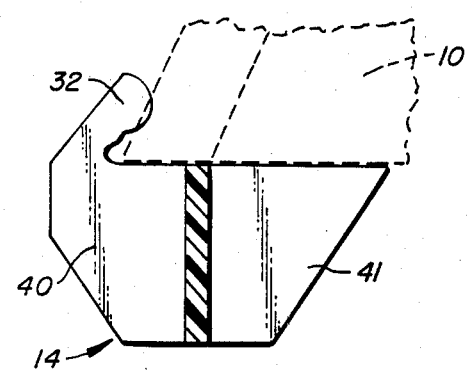
FIG._13.
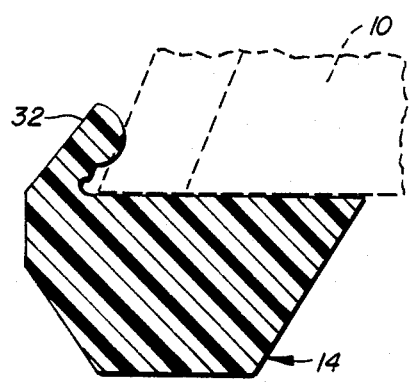
FIG._14.
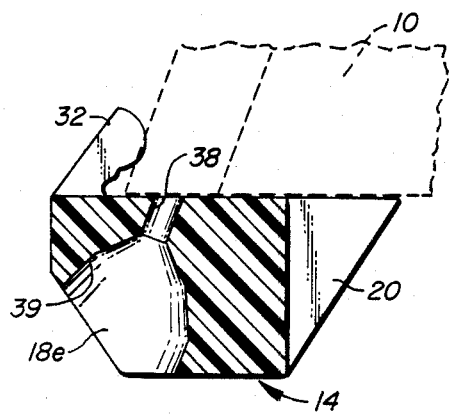
FIG._15.
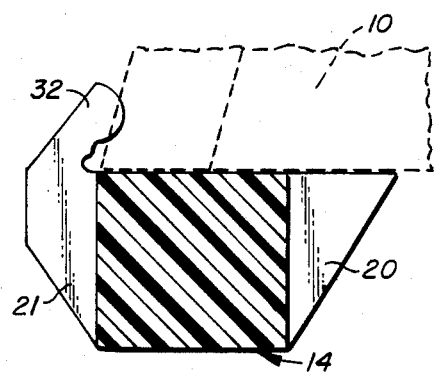
FIG._16.
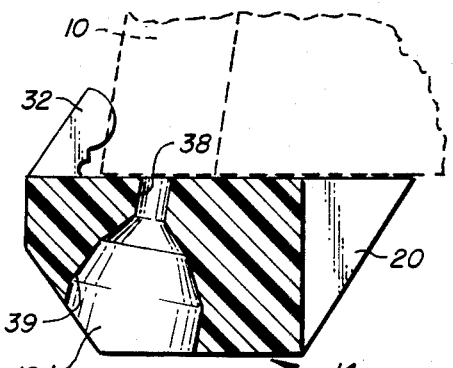
FIG._17.

FLEXIBLE HORSESHOE

BACKGROUND OF THE INVENTION

1. Field of the Invention

The present invention relates to horseshoes. More particularly, the present invention relates to a molded flexible screw-on horseshoe.

2. Description of the Prior Art

Horseshoe: A shoe for horses usually consisting of a narrow plate of iron shaped to fit the rim of a horse's hoof and being somewhat U-shaped (Webster's New Collegiate Dictionary).

Almost all domesticated horses are shod. That is, a horseshoe is secured to the horse's hoof to protect the hoof from damage. The practice of shoeing horses has its origins over 2,000 years ago.

Present horseshoes are made from the following types of materials:
(1) Steel
(2) Aluminum
(3) Natural Rubber
(4) Plastic
(5) Elastomeric Materials Steel (or iron) horseshoes are commercially produced according to a design that has changed very little in the 2,000 years since horses were first shod. Such shoes are attached to the horse's hoof with a series of nails driven into the hoof.

Aluminum horseshoes are used mostly in the horse racing industry because of their light weight. Such horseshoes are not wear resistant, and provide neither shock absorption nor exceptional traction under varying track surface conditions.

Rubber horseshoes resemble a boot which covers the horse's entire hoof. Such boots are not wear resistant, are heavy, and are difficult to keep attached to the horse's hoof. Rubber horseshoes are used to protect a horse's hoof when a regular horseshoe has fallen off, between shoeings, and when the hoof is being medicated. They may also be used for short term special-purposes.

Plastic or elastomeric horseshoes are generally less expensive than rubber horseshoes, but require significant installation time. The increase in installation time results from the need to nail through the material and to trim and file excess horseshoe material after attachment of the shoe to the hoof.

SUMMARY OF THE INVENTION

The present invention is a screw-on horseshoe formed from a plastic material, such as a polyurethane elastomer or a composite urethane. The use of a plastic material in forming the horseshoe improves shock absorption and impact resistance of a horse's hoof, while providing wear resistance similar to that of steel. An additional advantage of horseshoes produced in accordance with the present invention is that they are lighter in weight than steel and almost the same weight as aluminum having the same design.

A horseshoe made in accordance with the present invention is stiff, and shapeable, yet flexible, allowing it to readily flex when the horse steps. Another advantage of the present invention is that the horseshoe is quickly shaped while it is attached to the horse's hoof. As a result, trimming of excess material is not required—as is necessary when prior art elastomer plastic horseshoes are installed. Nor is any other additional work, such as hammering to form as in steel horseshoes.

A novel feature of the present invention is the provision of a horseshoe flex joint at the hoof quarter area. A horse's hoof is a living tissue which expands and contracts as pressure is applied to it and is released. An advantage of the novel horseshoe flex joint is that the horseshoe can expand and contract with the hoof in response to pressure resulting from the horse's steps. Another advantage of the novel horseshoe flex joint is that the horseshoe can "grow" along with the hoof. Another advantage of the novel flex joint is elimination of persistent friction present between the horse's hoof and existing conventional horseshoes which causes horse discomfort and restricts the normal hoof wall movement.

The method of attachment used in the present invention is in contrast to that used for prior art horseshoes which are held to the horse's hoof with nails (or straps in the case of boots). The present horseshoe is held to the horse's hoof with a novel thread pattern screw. The novel thread pattern screw eliminates shock absorbed by the hoof when horseshoe nails are hammered into the hoof.

The screw used in the present invention has a double helix hi-lo thread pattern on the screw shaft. The novel thread pattern allows the screw diameter to be less than that of conventional horseshoe nails. Also, the screw does not penetrate the hoof wall, as does a nail. This characteristic of the screw causes less damage to the hoof, while providing greater pull-out strength for securing the horseshoe to the hoof. In the preferred embodiment of the invention, the screw is made of stainless steel or corrosive coated hardened steel to avoid rusting.

The screw head has a novel pattern that allows the screw's installation due to a self holding screw head pattern and optional magnetic driver along with the use of a complementary installation tool driven by a quiet battery powered drill motor. Another advantage of the novel screw is that the screw is reusable. Accordingly, replacing a horseshoe does not necessitate replacing the retaining screws. Thus, replacement and inventory costs are reduced. The use of screws reduces installation labor of horseshoes by about 50%.

The present invention may be produced in a variety of sizes to closely conform to the shape of the horse's hoof. These sizes are comparable to those most commonly used for steel horseshoes. The present invention also is available in a variety of styles. These styles correspond to all of the conventional styles offered for prior art horseshoes and also a number of additional styles made possible by the molding characteristic of urethane. One embodiment of the present invention includes a novel toe insert made of a high wear polymer. The toe insert improves horseshoe wear resistance. The toe insert also may be used in a variety of performance applications, such as in racing.

Another novel feature of the present invention is the inclusion of a lip formed around the top of the horseshoe and that partially covers the hoof wall. The lip "molds" the horseshoe to the hoof. This maintains the horseshoe's shape while it is held in place on the hoof during installation. As a result, horseshoe shaping and installation are easier and therefore require less labor of the farrier. Also, the lip protects the outer hoof wall from chipping and acts as a bumper when the hoof is struck from the side.

Accordingly, a novel horseshoe and horseshoe attachment device is disclosed. The horseshoe requires significantly less labor to install than conventional horseshoes. Yet the subject horseshoe is of lighter weight and has greater resistance to wear than most prior art horseshoes. Additionally, the present horseshoe is installed with less damage to the horse's hoof. Once installed, the horseshoe readily flexes with the horse's hoof to cushion the impact of the hoof with the ground. Traction is also improved by the present horseshoe.

BRIEF DESCRIPTION OF THE DRAWINGS

FIG. 1 is a perspective view of a horse's hoof having attached thereto a horseshoe according to the present invention;

FIG. 2 is a bottom view of the present horseshoe;

FIG. 3 is a perspective view of a screw for use with the present horseshoe according to the present invention;

FIG. 4 is a cross section view of the present horseshoe taken along line 4 in FIG. 2;

FIG. 4a is a perspective view showing the inner and outer slot portions attached to the base;

FIG. 5 is a cross section view of the present horseshoe taken along line 5 in FIG. 2;

FIG. 6 is a cross section view of the present horseshoe taken along line 6 in FIG. 2;

FIG. 7 is a cross section view of the present horseshoe taken along line 7 in FIG. 2;

FIG. 8 is a cross section view of the present horseshoe taken along line 8 in FIG. 2;

FIG. 9 is a cross section view of the present horseshoe taken along line 9 in FIG. 2;

FIG. 10 is a cross section view of the present horseshoe taken along line 10 in FIG. 2;

FIG. 11 is a cross section view of the present horseshoe taken along line 11 in FIG. 2;

FIG. 12 is a cross section view of the present horseshoe taken along line 12 in FIG. 2;

FIG. 13 is a cross section view of the present horseshoe taken along line 13 in FIG. 2;

FIG. 14 is a cross section view of the present horseshoe taken along line 14 in FIG. 2;

FIG. 15 is a cross section view of the present horseshoe taken along line 15 in FIG. 2;

FIG. 16 is a cross section view of the present horseshoe taken along line 16 in FIG. 2; and FIG. 17 is a cross section view of the present horseshoe taken along line 17 in FIG. 2.

DETAILED DESCRIPTION OF A PREFERRED EMBODIMENT

The present invention relates to horseshoes. A horse's hoof 10, including a periople portion 11 and a coronary band 12 is shown in FIG. 1. When prior art horseshoes are attached to the hoof, they are fastened thereto with nails driven through the hoof at an angle so that the point of the nail protrudes through the hoof wall. The end of the nail is clinched. Accordingly, the hoof shown in FIG. 1 exhibits a number of clinches 13 protruding through the hoof wall.

The present invention is a horseshoe 14 made of a plastic material, such as a polyurethane elastomer, polyurethane composite, or other such plastic material. The material's properties may be varied by including various additives, such as fiberglass and/or silicone. The horseshoe is attached to the hoof with screws, preferably stainless steel screws or corrosive coated hardened steel to avoid rust and corrosion. A bottom view of the horseshoe is shown in FIG. 2.

Horseshoe 14 includes a base portion 16 that provides a contact point between the hoof and the ground. A plurality of bores 18a-18i extend through the horseshoe from base portion 16. The bores receive a fastener, such as screw 24 (FIG. 3) for attaching the shoe to the hoof. Because the shoe is made of a plastic material, it is easily molded and is of a flexible shape.

The exemplary embodiment of the horseshoe has a plurality of slotted channels, including an inner channel portion 20 and an outer channel portion 21. The slotted channels enable a farrier to shape the shoe to the hoof when the horse is shod. Hammering nails to install prior art horseshoes and trimming prior art plastic horseshoes is eliminated. Thus, horseshoe installation time and effort are significantly reduced.

The present invention includes a flex joint 22, having an inner portion 41 and an outer portion 40. The flex joint is positioned at the rear quarter section of the hoof and allows the horseshoe to flex with the hoof upon impact of the hoof with the ground. Line 52 in FIG. 2 shows horseshoe's flexion to accommodate hoof movement (shown in phantom). In this way, the persistent problem of abrasion between the hoof and the horseshoe is eliminated. There is less damage to the hoof and the horseshoe is less likely to need be removed and replaced to eliminate such abrasion.

Base portion 16 is shown in FIG. 2 having a width 23. It should be appreciated that the width of the horseshoe base portion is not necessarily the same throughout the base of the horseshoe. Rather, the base portion has a varying width to accommodate areas of greater wear. For example, the toe portion tends to be wider and thicker than the hoof quarter section portion because it is an area of greater wear.

One embodiment of the invention provides a horseshoe having an insert 36 to provide selected horseshoe wear and traction qualities. For example, a material having the properties of being very hard, and thus having a long wear life, may be inserted into the horseshoe toe portion as insert 36 to extend the life of the shoe. The entire horseshoe is preferably not made of such a hard material as it would tend to make the horseshoe brittle and less flexible. An example of such material is the abrasion resistant UHMW polymer No. 1900, manufactured by Hercules, Inc. of Wilmington, Del. Additionally, various pads may be added to the inner area of the horseshoe, such as frog/sole pad 60. Such pads provide selected traction property to the horseshoe while protecting the bottom of the hoof.

FIG. 2 locates a number of sectional views of the subject horseshoe along the lines 4–17. The number of the sectional view corresponds to the number of the figure in which the view is illustrated. A better understanding of the present invention may be had by referring to these figures.

FIG. 3 is a perspective view of a novel screw 24 of the type to be used to fasten the horseshoe to the hoof. Screw 24 includes a head portion 25 having a recessed socket, such as hex line socket 27 which may be magnetized for self adhering to tools, and having a shaft portion 26, including a novel double helical thread pattern having a high profile thread 28 and a low profile thread 29. Socket 27 readily receives a complementary driving tool attached to a battery operated power drill. In this way, the screw may be readily driven into the horse's hoof in an effortless way. Because a hammer or mallet is not used to drive the fastener into the hoof, as is the case when nails are used, there is less shock to the horse's leg and the farrier is less prone to startle or hurt the horse.

The high/low thread pattern allows screw 24 to be produced having a very thin shaft. Accordingly, less of the horse's hoof is displaced or damaged by the fastener. Yet the fastener is able to cut a deep thread into the hoof to securely hold the horseshoe thereto. Because a screw is used as a fastener, the fastener may be readily removed without injury to the hoof. A horseshoe may be removed and replaced, using the same fastener in the same hole. In contrast, prior art horseshoes rely on holes through the hoof wall by which a clinch may be formed with the fastener to hold the horseshoe to the hoof. The present invention does not damage the hoof wall and yet provides a more reliable, more secure fastening of the shoe to the hoof.

FIG. 4 is a cross sectional view taken along line 4 in FIG. 2. Horseshoe 14 is shown snugly attached to the base of hoof 10. FIG. 4 shows an inner slot portion 20 and an outer slot portion 21 which provide support for the horse's hoof and yet which permit the shoe to readily flex to be easily formed to shape when the horseshoe is fastened to the hoof. Slot portions 20/21 also permit the horseshoe to be shaped to flex readily.

One feature of the invention is the inclusion of chamfered surfaces 30a/30b. Because these surfaces are downwardly sloping, an accumulation of mud or other such debris does not collect about the hoof/horseshoe. The hoof is thereby kept clean and is less likely to rot or become infested. To lighten the horseshoe, a portion 51 may be removed (as shown) without altering the wear and traction properties of the horseshoe. The horseshoe front portion 53 is flattened in some embodiments of the invention to prevent the hoof from rolling about the axis of the horse's leg.

The invention also includes a bumper lip 32 having an inner surface 33 which fits snugly against the hoof and an outer surface 34. The bumper lip protects the hoof against chipping or scratching when obstacles such as stones or sticks are encountered by the hoof. Surface 34 of bumper lip 32 cushions the upper hoof surface and prevents contact of the hoof with such travel encountered obstacles. Bumper guard 50 cushions the lower hoof surface.

FIG. 5 is a cross sectional view taken along line 5 in FIG. 2. Insert 36 is shown within the horseshoe base portion. The horseshoe may be formed initially by a molding process that leaves an area occupied by insert 36 empty. The desired insert is then poured or otherwise inserted into the empty portion of the horseshoe and allowed to cure if poured. The insert is thereafter an integral part of the horseshoe that is not likely to become separated from it. The insert provides selected wear and/or traction qualities to the horseshoe. It should be appreciated that a horseshoe may be made of a plastic material by any of the known molding processes. The horseshoe is provided in any number of standard sizes having optional inserts as desired (if desired), and having a base portion thickness and tread pattern as desired.

FIG. 10 is a cross sectional view of horseshoe 14 showing bore 18g including an outer bore surface 39 having a sloping funnel shape of a diameter substantially greater than that of screw head 25. Inner surface 39 is formed so that screw 24 is countersunk into the horseshoe. It is not likely that screw head 25 can be damaged upon impact of the hoof with the ground because it is shielded by the horseshoe. Bore 18g includes a shaft receiving portion 38 of a diameter slightly larger than that of the high thread portion of screw shaft 26.

Bore 18g is substantially parallel to the hoof wall. A screw may be driven into the hoof without the possibility of the screw damaging the hoof wall. The wall remains undamaged and the integrity of the hoof is insured.

FIG. 13 is a cross sectional view taken along line 13 in FIG. 2. Flex joint 22 is shown in FIG. 13 and should be contrasted with the slotted portions of the horseshoe as shown, for example, in FIG. 16. Flex joint 22 includes an outer flex surface 40 and an inner flex surface 41. The hoof and horseshoe act as though they were one and flex naturally upon impact of the hoof with the ground.

The foregoing was given for purposes of illustration and example. The present invention is a novel horseshoe that requires significantly less labor to install than conventional horseshoes, yet is of lighter weight, has greater resistance to wear, and is less damaging to the hoof than conventional horseshoes. It will be appreciated by those skilled in the art that the present horseshoe may be made in various sizes, and with various inserts and base portion traction patterns as the application requires. Additionally, various features of the invention may be enlarged or dispensed with. For example, the bumper lip may be eliminated for some applications, and it may be produced in a larger size to cover substantially more of the hoof area for other applications. The chamfered portions of the horseshoe, in addition to preventing an accumulation of debris, also allow the shoe to give the horse a more natural "rolling" type step. The chamfers may be rounded or eliminated as desired. Also, additional flex joints may be added as required by application. In all applications, however, it is anticipated that the horseshoe will be fastened to the hoof with screws as shown and that slots and/or flex joints will be provided. Therefore, the scope of the invention should be limited only by the breadth of the claims.

I claim:

1. An improved horseshoe for mounting on the hoof of a horse comprising:
    a molded base, formed of a plastic material, for providing contact surface between the hoof and the ground;
    a plurality of outer slot portions formed along a first surface of said base for supporting the hoof, each of said outer slot portions having a bumper lip for snugly fitting against the front of the hoof, with said plurality of outer slot portions spaced to allow the bending of the horseshoe to conform to the shape of the hoof while the lip molds the horseshoe to the hoof during the fastening of the horseshoe to the hoof;
    a plurality of inner slot portions supporting the hoof spaced to allow the bending of the horseshoe to conform to the shape of the hoof; and,
    a flex joint comprising a narrowed section of said base for allowing the horseshoe to flex with the hoof upon impact with the ground.

2. The invention of claim 1 wherein the number of inner slot portions is equal to the number of outer slot portions.

3. The invention of claim 2 further comprising:

a molded insert of a selected plastic material formed by pouring the selected material into an empty area formed during the molding of the base so that said insert is an integral part of said base and is not likely to become separated from said base.

4. The invention of claim 3 further including means for fastening the horseshoe to the hoof comprising:

a plurality of fasteners including a head portion and a threaded shaft portion for securing said horseshoe to said hoof without piercing a hoof wall; and a plurality of bores formed through said base, each of said bores providing a port for receiving one of said threaded fasteners, said base having a portion of lesser diameter for receiving said fastener threaded shaft portion and having a portion of greater diameter for receiving and retaining said fastener head portion within said base, said bore portion of greater diameter allowing recessed reception of said fastener head portion within said base portion, with said bore being formed at an angle substantially identical to that of said hoof wall.

* * * * *